US008977742B1

(12) United States Patent
Tang et al.

(10) Patent No.: US 8,977,742 B1
(45) Date of Patent: Mar. 10, 2015

(54) REMOTE VALIDATION OF USER INTERACTIONS FOR CLIENT-SIDE SCRIPTING

(75) Inventors: Jonathan D. Tang, Mountain View, CA (US); Kristopher Hom, San Jose, CA (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 13/570,142

(22) Filed: Aug. 8, 2012

(51) Int. Cl.
*G06F 15/16* (2006.01)

(52) U.S. Cl.
USPC .......................................... 709/224; 726/26

(58) Field of Classification Search
CPC ............ G06F 17/30; G06F 12/00; G06F 3/00
USPC ................................................. 707/827, 781
See application file for complete search history.

(56) References Cited

U.S. PATENT DOCUMENTS

| 2010/0095208 | A1* | 4/2010 | White et al. | 715/704 |
| 2012/0203807 | A1* | 8/2012 | Larimore et al. | 707/827 |
| 2012/0283008 | A1* | 11/2012 | Martone | 463/29 |

* cited by examiner

*Primary Examiner* — David Lazaro
*Assistant Examiner* — Zia Khurshid
(74) *Attorney, Agent, or Firm* — McDermott Will & Emery LLP

(57) ABSTRACT

A system for remote validation of user interactions for client-side scripting may include one or more processors and memory. The processors may receive a transcript of user interactions recorded during an execution of a client-side script and a corresponding score. The transcript may include an indication of a relative time when each user interaction was recorded. The processors may execute the client-side script and recreate the user interactions during the execution at the relative times indicated by the transcript, may calculate a second score for the user interactions based at least in part on at least some of the user interactions and the relative times when the user interactions are recreated during the execution of the client-side script, and may provide the second score when it is equivalent to the received score, otherwise may provide an indication that the user interactions are invalid and/or that the received score is invalid.

18 Claims, 5 Drawing Sheets

REMOTE VALIDATION OF USER INTERACTIONS FOR CLIENT-SIDE SCRIPTING

TECHNICAL FIELD

The present description relates generally to a validation system, and more particularly, but not exclusively, to a system for remote validation of user interactions for client-side scripting.

BACKGROUND

Client-side scripting may refer to web-based programs that are executed client-side, such as within a web browser. Since client-side scripts are locally executed within a web browser on a device, as opposed to being executed on a remote server, client-side scripts may be able to quickly respond to user events, such as user interactions. As such, client-side scripts may be well-suited for programs that need to respond quickly to user interactions and that can be executed independent of a server.

For example, web-based games that include graphics that change in response to user interactions, and/or scores that are calculated based on user interactions, may be well suited for a client-side scripting implementation. A client-side script for a web-based game may execute in a web browser, independent of a server. A user may interact with the web-based game and the client-side script may respond to the user interactions and/or maintain a score for the user based on the user interactions. At the completion of the web-based game, the web browser may communicate the final score for the user's interactions with the web-based game to a server, such as through a Hypertext Transfer Protocol (HTTP) request. The score for the user may be stored on the server and/or the score may be communicated to an external system for comparison against other users' scores, such as a leaderboard system, or another score aggregation system.

However, a possible drawback to client-side scripting is that the source code of a client-side script is often accessible to the users, such as through the web browser. As such, a user may be able to access the source code for the client-side script and determine the syntax for making unauthorized function calls within the client-side script, such as to improve the user's score in a web-based game. Similarly, a user may be able to access the source code of the client-side script and determine the syntax for a communication of a final score to the server. In this instance, the user may be able to mimic the syntax of the communication of the final score to the server in order to communicate a score of any value, such as a high score, irrespective of whether the user's interactions with the web-based game actually correlate to the high score. Thus, for any client-side script that communicates a value to a server for user interactions during the execution of the client-side script, such as a score of a web-based game, there is a possibility that the value being communicated to the server has been illicitly modified, and/or tampered with, by the user.

SUMMARY

The disclosed subject matter relates to a computer-implemented method for remote validation of user interactions for client-side scripting. The method may include receiving, using one or more computing devices and over a network, a transcript of a plurality of user interactions recorded during an execution of a client-side script, wherein the transcript comprises an indication of a relative time when each of the plurality of user interactions was recorded during the execution of the client-side script, executing, using the one or more computing devices, the client-side script, wherein each of the plurality of user interactions is provided to the executing client-side script at the relative time indicated by the transcript, determining, using the one or more computing devices and during the executing the client-side script, whether any user interaction of the plurality of user interactions provided to the executing client-side script comprises an invalid interaction for the executing client-side script at the time when the user interaction is provided to the executing client-side script, and providing, using the one or more computing devices, an indication of whether the plurality of user interactions are valid for the client-side script based at least in part on the determining.

In another aspect, a computer-implemented method for remote validation of user interactions for client-side scripting may include executing, using one or more computing devices, a client-side script received over a network, intercepting, using the one or more computing devices, a plurality of user interactions provided during the executing of the client-side script, generating, using the one or more computing devices, a transcript of the plurality of user interactions, wherein the transcript comprises a description of each of the plurality of user interactions and an indication of when each of the plurality of interactions was provided relative to the executing of the client-side script, sending, using the one or more computing devices and over the network, the transcript of the plurality of user interactions to one or more other computing devices, receiving, using the one or more computing devices and over the network, a value corresponding to the plurality of user interactions or an indication that the plurality of user interactions are invalid from the one or more other computing devices, and presenting, using the one or more computing devices, the value corresponding to the plurality of user interactions or the indication that the plurality of user interactions are invalid.

The disclosed subject matter also relates to a system for remote validation of user interactions for client-side scripting. The system may include one or more processors and a memory including instructions that, when executed by the one or more processors, cause the one or more processors to receive, over a network, a transcript of a plurality of user interactions recorded during an execution of a client-side game script and a first score for the plurality of user interactions, wherein the transcript comprises an indication of a relative time when each of the plurality of user interactions was recorded relative to the execution of the client-side game script, execute the client-side game script, wherein each of the plurality of user interactions is recreated at the relative time during executing the client-side game script that is indicated by the transcript, calculate, during executing the client-side game script, a second score for the plurality of user interactions, wherein the second score is determined based at least in part on values associated with at least some of the plurality of user interactions and the relative times when the at least some of the plurality of user interactions are recreated during executing the client-side game script, and provide the second score when the second score is equivalent to the first score, otherwise provide an indication that the plurality of user interactions are invalid.

The disclosed subject matter also relates to a machine-readable medium embodying instructions that, when executed by a machine, allow the machine to perform a method for remote validation of user interactions for scripting. The method may include receiving, over a network, a transcript of a plurality of user interactions recorded during an execution of a script, wherein the transcript comprises an indication of a time when each of the plurality of user interactions was recorded relative to the execution of the script. The method may further include executing the script within a script engine, wherein each of the plurality of user interactions is provided to the script during the executing at the time indicated by the transcript, determining, during the executing, whether any user interaction of the plurality of user interactions provided to the executing script comprises an invalid interaction for the executing script at the time when the user interaction is provided to the executing script, and providing an indication of whether the plurality of user interactions are valid for the script based at least in part on the determining.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
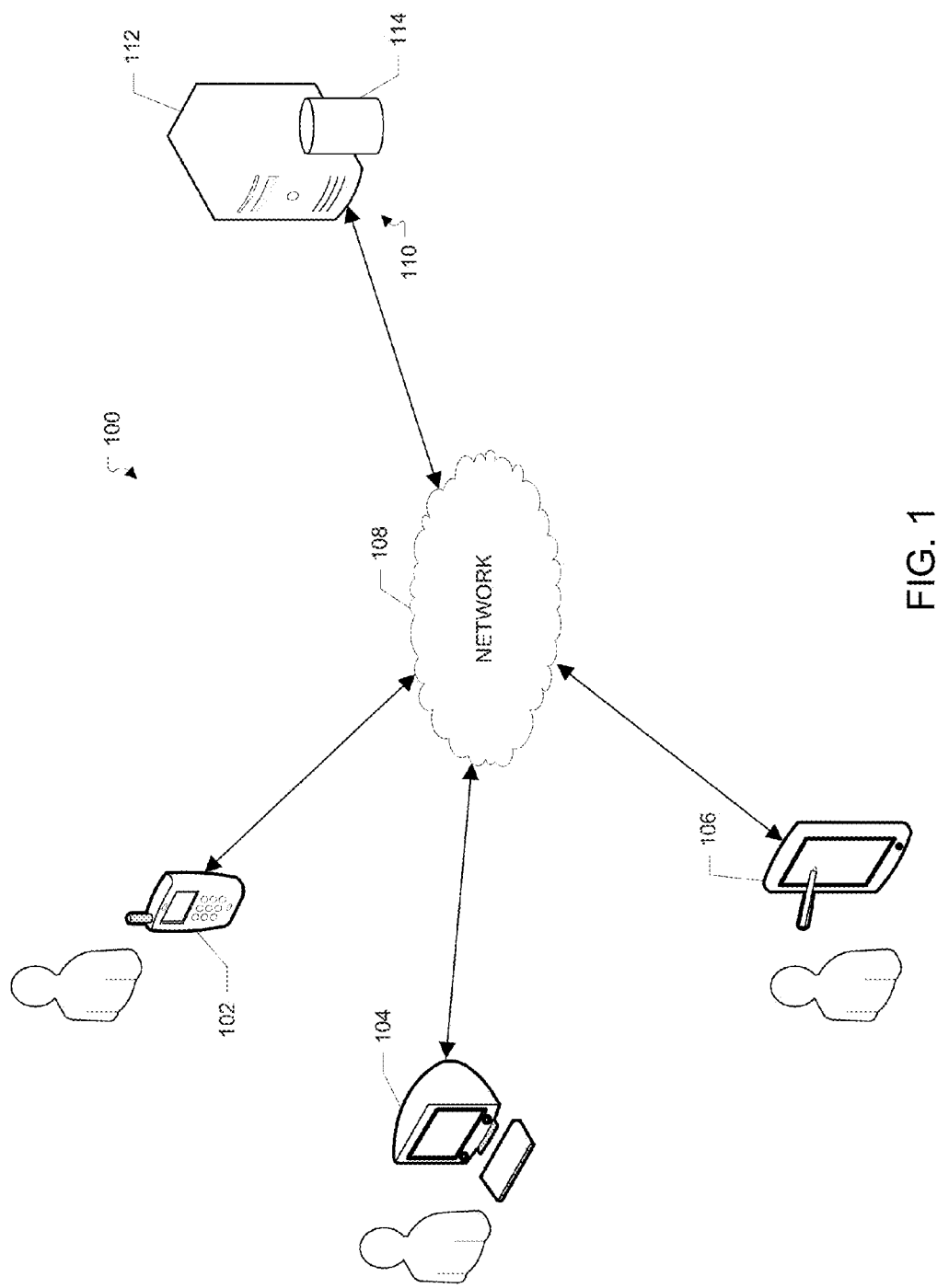
FIG. 1 illustrates an example client-server network environment that may implement a system for remote validation of user interactions for client-side scripting.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

In a system for remote validation of user interactions for client-side scripting, a client-side script may generate a transcript of a user's interactions during the execution of the client-side script, such as by intercepting and recording browser events during the execution of the client-side script. The transcript may include an indication and/or description of each user interaction and an indication of a time when the user interaction occurred relative to the execution of the client-side script. For example, the indication of the time when a user interaction occurred may be the number of milliseconds that elapsed since the start of the client-side script. In some instances, the execution of a client-side script may be divided into a number of linear steps, or ticks. In this instance, the indication of the time when a user interaction occurred may be the number of ticks that elapsed since the start of the client-side script. Alternatively, the indication of the time when a user interaction occurred may be any value that identifies when the user interaction occurred relative to the execution of the client-side script.

Upon completion of the client-side script, the web browser may communicate the transcript to a server, along with any value associated with the user's interactions with the client-side script, such as a score for a web-based game. However, as previously noted, a user may be able to illicitly improve their score, such as by making unauthorized function calls within the client-side script. In some instances, if a user illicitly improves their score, such as by circumventing the normal operation of the client-side script, the improved score may not accurately reflect the user's interactions with the web-based game, as recorded in the transcript.

The server may receive the transcript of the user's interactions along with the value associated with the user's interactions at the completion of the execution of the client-side script. The server may then re-execute the client-side script, in a server-side script engine, with each of the user interactions described in the transcript being recreated during the execution of the client-side script at the time indicated by the transcript. In this manner, the server may effectively replay the user's actual interactions with the web-based game, based on the user interactions recorded in the transcript. Since the server executes the client-side script in a server-side script engine, the functions within the client-side script that are related to displaying graphical elements do not need to be re-executed by the server. As such, in order to conserve processing resources, any functions related to displaying graphical elements may be replaced with null functions prior to the server-side execution of the client-side script. In this manner, calls to the functions related to displaying graphical elements will still be valid, but the server will not waste processing resources evaluating the functions.

During the execution of the client-side script within the server-side script engine, the server may determine whether a recreated user interaction is invalid for the web-based game at the time within the execution of the client-side script that the user interaction is recreated. For example, a user may have circumvented game logic to improve their score by illicitly mimicking user interactions within the web-based game. Thus, the server may validate each of the recreated user interactions with the game logic at that time within the web-based game that the user interactions are recreated. If the server determines that any of the user interactions are invalid for the web-based game at the time indicated by the transcript, the server may determine that the score received for the user's interactions is invalid.

If the execution of the client-side script completes without identifying any invalid user interactions, the server may compare the score determined by the execution of the client-side script within the server-side script engine with the score communicated to the server with the transcript. If the score communicated to the server is equivalent to the score determined by the execution of the client-side script within the server-side script engine, the server may determine that the communicated score is valid for the user's interactions. In this instance, the server may store the score for the user's interactions, such as to compare with scores associated with other users' interactions. For example, the server may present a leaderboard to the users that identifies the users' with the highest scores.

Alternatively, or in addition, the server may provide an indication to the user that their score is valid when the value determined by the server is equivalent to the value communicated to the server and the transcript does not include any invalid user interactions. Otherwise, the server may provide an indication to the user that the score is invalid. In the example of a web-based game, at the completion of the execution of the client-side script, the user may be presented with the score being communicated to the server along with an indication that the score is "unofficial." If the server subsequently determines that the score is valid, the user may be presented with an indication that the score is "official." However, if the server determines that the score is invalid, the user may be presented with an indication that the score has been "disqualified."

Alternatively, or in addition, the server may aggregate multiple transcripts, such as from multiple users, and may periodically validate the aggregated transcripts. In this example, the server may use a parallel processing framework and/or a distributed processing framework, such as a map reduce framework, to efficiently validate multiple transcripts in parallel. In the example of a web-based game, upon validating the aggregated transcripts, the server may communicate all of the scores determined to be valid to a leaderboard or score aggregation system, and the server may discard all of the scores determined to be invalid.

Alternatively, or in addition, the logic of the client-side script may be written in a language that is a subset of a server-side language, or can be easily transformed into a server-side language. For example, since the expression and literal data structure syntax of JavaScript and Python are substantially similar, the client-side script could be written in the subset of JavaScript that is also valid in Python. In this example, the client-side script could be executed on the server without the need for a server-side script engine.

II. Example Client-Server Network Environments for a System for Remote Validation of User Interactions for Client-Side Scripting FIG. 1 illustrates an example client-server network environment which may implement a system for remote validation of user interactions for client-side scripting. Not all of the depicted components may be required, however, and some implementations may include additional components not shown in the figure. Variations in the arrangement and type of the components may be made without departing from the spirit or scope of the claims as set forth herein. Additional, different or fewer components may be provided.

Network environment 100 may include a number of electronic devices 102, 104, 106 communicably connected to server 110, such as by network 108. In another example, electronic devices 102, 104, 106 may be communicably connected to one another, such as by network 108, but not communicably connected to server 110. Network 108 may be a public communication network (such as the Internet, cellular data network, dialup modems over a telephone network) or a private communications network (such as private local area network ("LAN"), leased lines). Network 108 may also include, but is not limited to, any one or more of the following network topologies, including a bus network, a star network, a ring network, a mesh network, a star-bus network, a tree or hierarchical network, and the like.

In some example embodiments, electronic devices 102, 104 and 106 can be computing devices such as laptop or desktop computers, smartphones, personal digital assistants ("PDAs"), portable media players, tablet computers, televisions or other displays with one or more processors coupled thereto and/or embedded therein, or other appropriate computing devices that can be used for displaying a web page, a web application, or otherwise executing a client-side script. In the example of FIG. 1, electronic device 102 is depicted as a desktop computer, electronic device 104 is depicted as a smartphone, and electronic device 106 is depicted as a tablet device.

In one example, server 110 includes one or more processing devices 112 and data store 114. The one or more processing devices 112 execute computer instructions stored in data store 114, for example, to provide remote validation of user interactions for client-side scripts that executed on one or more of electronic devices 102, 104, 106. Data store 114 may store the computer instructions on non-transitory computer-readable medium.

In one example, server 110 may be a single computing device such as a computer server. In another example, server 110 may represent more than one computing device working together to perform the actions of a server computer (such as a cloud of computers and/or a distributed system). In another example, server 110 may be coupled with various databases, storage services, or other computing devices. Server 110 and the coupled databases, storage services, or other computing devices may be collocated, or may be disparately located.

Communications between electronic devices 102, 104, 106, and server 110 may be facilitated through the Hypertext Transfer Protocol ("HTTP") communication protocol. Other communication protocols may also be used including, for example, Extensible Messaging and Presence Protocol (XMPP) communication, for some or all communications between electronic devices 102, 104, 106 and server 110. In another example, electronic devices 102, 104, 106 may be in communication with one another without communicating with server 110.

Server 110 may transmit scripts to electronic devices 102, 104, 106, such as client-side scripts. Electronic devices 102, 104, 106 may receive the scripts and may execute the scripts independent of server 110. For example, electronic devices 102, 104, 106 may execute client-side scripts within a web browser independent of server 110. Alternatively, or in addition, client-side scripts may be executed on electronic devices 102, 104, 106 within any application or container.

In one example, a client-side script may be executed on electronic device 102, such as within a browser, to provide a web-based game to a user interacting with electronic device 102. For example, a web-based game may include graphics that change in response to user interactions, and/or scores that are calculated based on user interactions. The user may interact with electronic device 102 to participate in the web-based game during the execution of the client-side script. The client-side script may generate a transcript of the user's interactions with electronic device 102 during the execution of the client-side script, such as by intercepting and recording browser events during the execution of the client-side script. In one example, the client-side script may intercept browser events using a library that handles browser events within the browser. The transcript may include an indication and/or description of each user interaction and an indication of a time when the user interaction occurred relative to the execution of the client-side script. An example process for generating a transcript is described in FIG. 4 below.

One the execution of the client-side script completes, electronic device 102 may transmit the final score for the user's interactions with the web-based game, and the transcript of the user's interactions to server 110. Server 110 may validate the received score based on the user interactions recorded in the transcript. For example, server 110 may re-execute the client-side script, in a server-side script engine, with each of the user interactions described in the transcript being recreated during the execution of the client-side script at the time indicated by the transcript. In this manner, server 110 may effectively replay the user's interactions with the web-based game, based on the user interactions recorded in the transcript.

Server 110 may determine, during the server-side execution of the client-side script, whether any of the recorded user interactions are invalid for the client-side script and/or the game logic corresponding to the client-side script, at the time that the user interactions were recorded relative to the execution of the client-side script. If server 110 determines that any of the recorded user interactions are invalid interactions for the client-side script at the relative time that the user interactions were recorded, server 110 may transmit a notification to electronic device 102 that indicates that the received score is invalid. An example process for determining whether recorded user interactions are invalid is described in FIG. 3 below.

Server 110 may also generate a score for the recorded user interactions during the server-side execution of the client-side script. Server 110 may then compare the server-generated score with the score received from electronic device 102. If the score received from electronic device 102 is not equivalent to the server-generated score, server 110 may transmit a notification to electronic device 102 that indicates that the received score is invalid. Alternatively, if the score received from electronic device 102 is equivalent to the server-generated score, server 110 may transmit a notification to electronic device 102 that indicates that the received score has been validated.

Alternatively, or in addition, server 110 may validate scores received from electronic devices 102, 104, 106 asynchronously, such as on a periodic basis. For example, server 110 may receive scores and associated transcripts from electronic devices 102, 104, 106, and may store the received scores and associated transcripts, such as in data store 114. On a periodic basis, such as on a daily basis, an hourly basis, or generally any periodic basis, server 110 may perform a batch process to validate one or more received scores stored in data store 114. In one example, the batch process may include pipeline processing and/or may be performed through one or more stages of a pipeline process. Alternatively, or in addition, server 110 may use a parallel processing framework and/or a distributed processing framework, such as a map reduce framework, to efficiently validate multiple transcripts in parallel.

Figure 2:
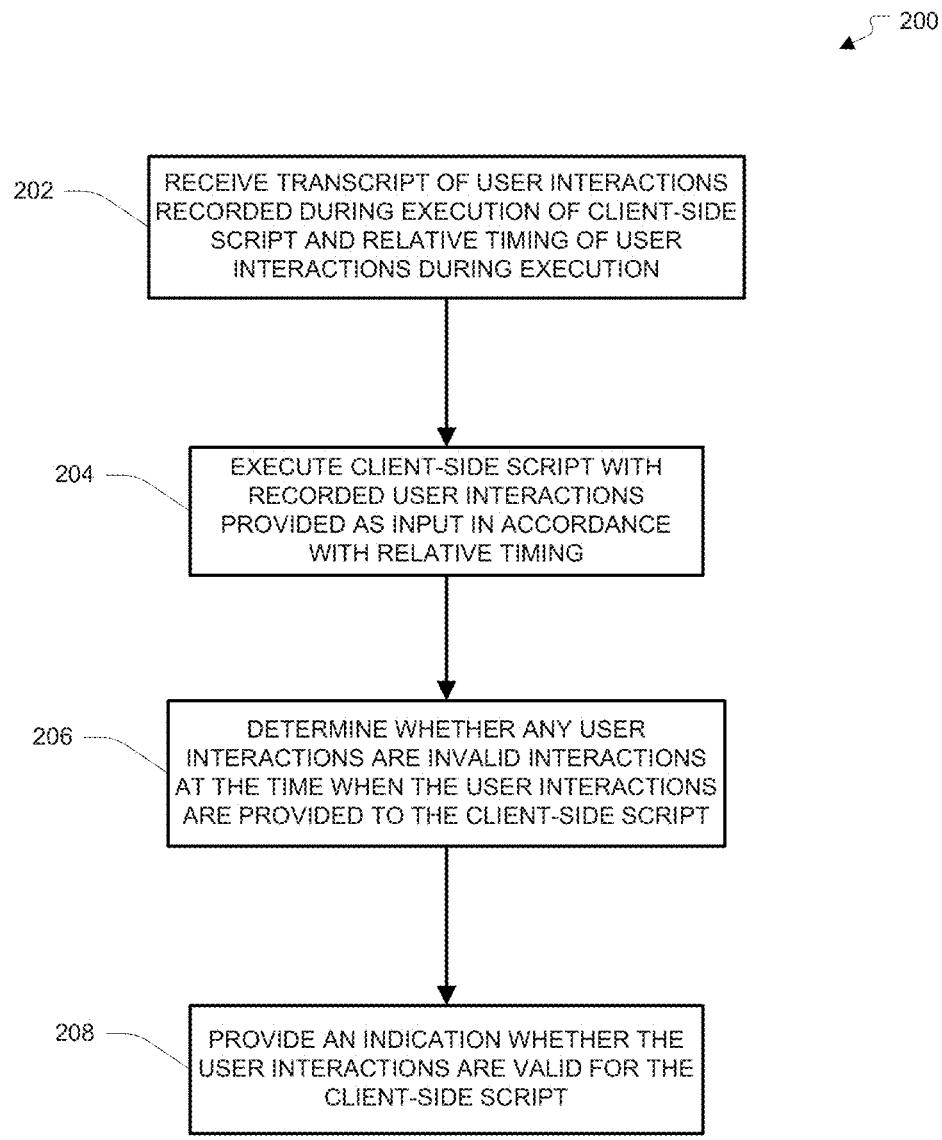
FIG. 2 illustrates a flow diagram of an example process for remote validation of user interactions for client-side scripting.

III. Example Processes for Remote Validation of User Interactions for Client-Side Scripting FIG. 2 illustrates a flow diagram of an example process 200 for a user association attribution system. For explanatory purposes, example process 200 is described herein with reference to the example network environment 100 of FIG. 1; however, example process 200 is not limited to the example network environment 100 of FIG. 1. Further for explanatory purposes, the blocks of example process 200 are described herein as occurring in serial, or linearly. However, multiple blocks of example process 200 may occur in parallel.

In block 202, server 110 receives a transcript of user interactions recorded during the execution of a client-side script from the device upon which the client-side script was executed, such as from electronic device 102. The transcript may include an indication or description of each user interaction along with an indication of the relative time that the user interaction occurred during the execution of the client-side script. The indication or description of the user interaction and the indication of the relative time may be any information that allows server 110 to recreate the user interaction during a server-side execution of the client-side script at the relative time when the user interaction occurred during the client-side execution of the client-side script. For example, the indication of the relative time when the user interaction occurred may be the number of milliseconds that elapsed since the start of the client-side script. Alternatively, or in addition, the execution of the client-side script may be divided into a number of linear steps, or ticks. In this instance, the indication of the time when a user interaction occurred may be the number of ticks that elapsed since the start of the client-side script.

In block 204, server 110 executes the client-side script with the recorded user interactions of the transcript provided as input to the client-side script. For example, each of the recorded user interactions may be recreated by the server 110 during the execution of the client-side script at the relative times indicated by the transcript. In one example, server 110 may execute the client-side script in a server-side script engine. In this example, the functions within the client-side script that are related to displaying graphical elements do not need to be re-executed by server 110. As such, in order to conserve processing resources, server 110 may replace any functions related to displaying graphical elements with null functions prior to the server-side execution of the client-side script, or during the server-side execution of the client-side script. In this manner, calls to the functions related to displaying graphical elements will still be valid, but server 110 will not waste processing resources evaluating the functions.

In block 206, server 110 determines, during the server-side execution of the client-side script, whether any of the user interactions that are provided as input to the client-side script are invalid interactions for the client-side script, and/or for the game logic corresponding to the client-side script, at the time that the user interactions are provided as input. For example, if the user made an illicit function call that circumvented the game logic to simulate a user interaction, such as to improve their score in a manner that would otherwise violate the game logic, the illicit function call may be recorded in the transcript. Thus, during the server-side execution of the client-side script, server 110 may determine that the user interaction that was simulated by the user is an invalid interaction for the client-side script at the relative time that the user interaction was provided as input to the client-side script.

In block 208, server 110 provides an indication to the device upon which the client-side script was executed, such as electronic device 102, that indicates whether the user interactions are valid for the client-side script. For example, if in block 206 server 110 determines that one or more of the user interactions that were provided as input during the server-side execution of the client-side script were invalid interactions at the time that they were provided as input, server 110 may provide an indication to electronic device 102 that indicates that one or more of the user interactions are invalid. Alternatively, if in block 206 server 110 determines that all of the user interactions that were provided as input during the server-side execution of the client-side script were valid interactions for the client-side script at the time that they were provided as input, server 110 may provide an indication to electronic device 102 that indicates that the user interactions are valid. In the instance of a web-based game, server 110 may also provide an indication that any score associated with the user interactions is also valid.

Figure 3:
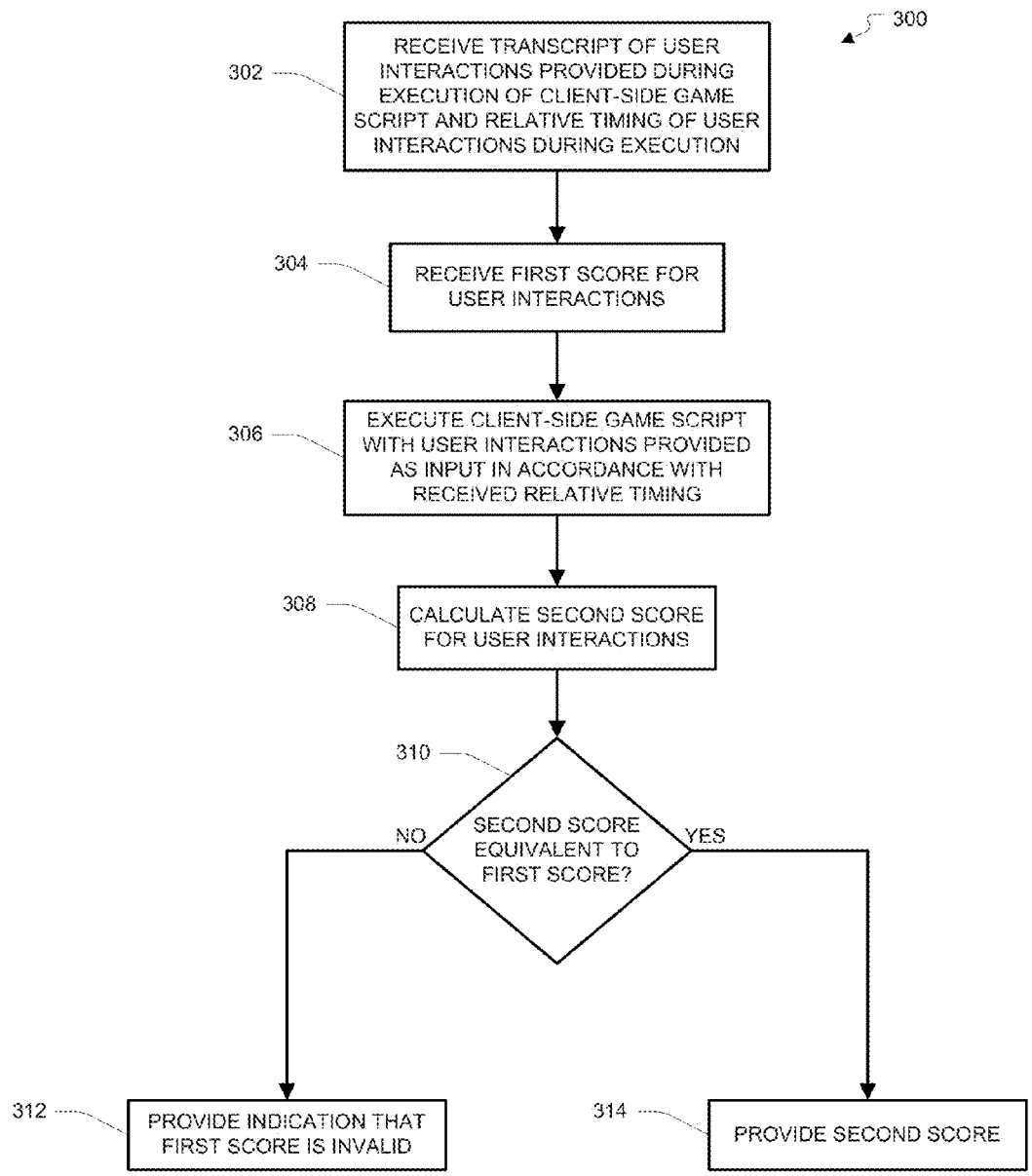
FIG. 3 illustrates a flow diagram of an example process for remote validation of user interactions for client-side scripting.

FIG. 3 illustrates a flow diagram of an example process 300 for a user attribution system. For explanatory purposes, example process 300 is described herein with reference to the example network environment 100 of FIG. 1; however, example process 300 is not limited to the example network environment 100 of FIG. 1. Further for explanatory purposes, the blocks of example process 300 are described herein as occurring in serial, or linearly. However, multiple blocks of example process 300 may occur in parallel.

In block 302, server 110 receives a transcript of user interactions recorded during the execution of a client-side game script from the device upon which the client-side game script was executed, such as from electronic device 102. For example, the execution of the client-side game script in a browser on electronic device 102 may provide a web-based game in which user interactions are correlated to a score. Alternatively, or in addition, the execution of the client-side game script may provide any web-based program in which user interactions are correlated with a value. The transcript may include an indication or description of each user interaction along with an indication of the relative time that the user interaction occurred during the execution of the client-side game script. The indication or description of the user interaction and the indication of the relative time may be any information that allows server 110 to recreate the user interaction during a server-side execution of the client-side game script at the relative time when the user interaction occurred during the client-side execution of the client-side game script.

In block 304, server 110 receives a first score determined for the user interactions during the client-side execution of the client-side game script. For example, the first score may be determined by the execution of the client-side game script on electronic device 102. In one instance, the first score may not correlate to the user interactions recorded in the transcript, such as if the user made an illicit function call during the execution of the client-side game script.

In block 306, server 110 executes the client-side game script with the recorded user interactions provided as input to the client-side game script at the relative times indicated by the transcript. In one example, server 110 may execute the client-side game script in a server-side script engine. In this example, server 110 may replace any functions related to displaying graphical elements with null functions prior to the server-side execution of the client-side game script, or during the server-side execution of the client-side game script.

In block 308, server 110 calculates a second score for the user interactions during the server-side execution of the client-side game script. For example, the second score for the user interactions may be calculated by the client-side game script during the execution of the client-side game script on server 110. In this example, the second score may be output by the client-side game script upon completion of the server-side execution of the client-side game script.

In block 310, server 110 determines whether the second score determined during the server-side execution of the client-side game script is equivalent to the first score determined during the client-side execution of the client-side game script. If, in block 310, server 110 determines that the second score is not equivalent to the first score, server 110 moves to block 312. In block 312, server 110 provides an indication to the device upon which the client-side game script was executed, such as electronic device 102, and/or to the user that achieved the first score, that indicates that the first score is invalid. In this instance, the user may not be awarded any credit or incentives for the first score. For example, the first score may not qualify to be included on any leaderboards, or other forms of recognition for scores associated with the client-side game script.

If, in block 310, server 110 determines that the second score is equivalent to the first score, server 110 moves to block 314. In block 314, server 110 may provide the second score to the device upon which the client-side game script was executed, such as electronic device 102, and/or another device or system, such as a ranking system, a leaderboard system, and/or any other system associated with recognizing scores associated with the client-side game script. Alternatively, or in addition, server 110 may provide an indication to the device upon which the client-side game script was executed, such as electronic device 102, and/or to the user that achieved the first score, that indicates that the first score is valid.

Figure 4:
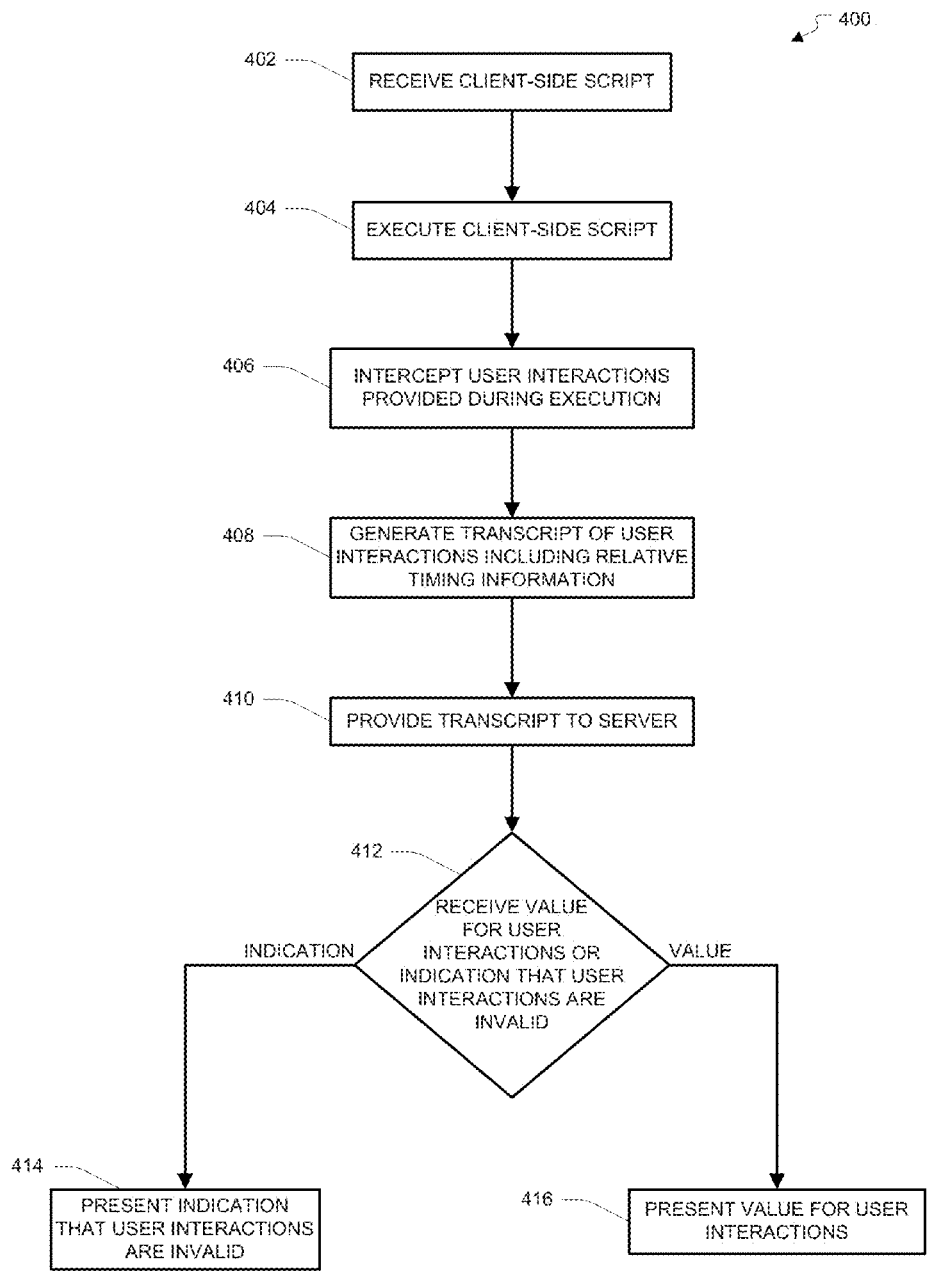
FIG. 4 illustrates a flow diagram of an example process for remote validation of user interactions for client-side scripting.

FIG. 4 illustrates a flow diagram of an example process 400 for providing a graphical representation of a multivariate dataset, such as in a user association attribution system. For explanatory purposes, example process 400 is described herein with reference to the example network environment 100 of FIG. 1; however, example process 400 is not limited to the example network environment 100 of FIG. 1. Further for explanatory purposes, the blocks of example process 400 are described herein as occurring in serial, or linearly. However, multiple blocks of example process 400 may occur in parallel.

In block 402, an electronic device, such as electronic device 102, receives a client-side script, such as from server 110. In block 404, electronic device 102 executes the client-side script, such as in a browser, or in any other application or container. In block 406, electronic device 102 intercepts user interactions that are provided during the execution of the client-side script on electronic device 102. In one example, the user interactions may be intercepted by the client-side script through the use of a library that handles web events. Alternatively, or in addition, the user interactions may be intercepted by a web-based program executing on electronic device 102, or other application executing on electronic device 102, that is separate from the client-side script.

In block 408, electronic device 102 generates a transcript of the intercepted user interactions including the relative timing of the user interactions, such as by recording information describing the user interactions. In one instance, the transcript may include any information that may be used to recreate the user interactions during a server-side execution of the client-side script, where the user interactions are recreated at the relative time when the user interactions were recorded during the client-side execution of the client-side script. For example, for a given user interaction the transcript may list the type of the user interaction, such as a mouse click, a keystroke, or generally any other type of user interaction, an indication of a location within the web browser associated with the user interaction, such as coordinates of the location where the mouse click occurred for the mouse click interaction, and the time that the user interaction occurred relative to the execution of the client-side script.

In block 410, electronic device 102 provides the transcript containing the recorded user interactions to server 110. In one example, electronic device 102 may not determine any value for the user interactions, such as a score, and may provide the transcript to server 110 without any value for the user interactions. Alternatively, or in addition, electronic device 102 may also provide a value or score determined during the client-side execution of the client-side script to server 110. In block 412, electronic device 102 receives a value for the user interactions from server 110, such as a score, or electronic device 102 receives an indication that the user interactions are invalid from server 110. For example, server 110 may determine whether the user interactions are valid for the client-side script and/or may determine a value for the user interactions, such as a score, when the user interactions are determined to be valid.

If, in block 412, electronic device 102 receives an indication that the user interactions are invalid, electronic device 102 moves to block 414. In block 414, electronic device 102 presents an indication that the user interactions are invalid. For example, electronic device 102 may provide a notification, such as on a display, that indicates that the user interactions are invalid. If, in block 412, electronic device 102 receives a value, such as a score, for the user interactions, electronic device 102 moves to block 416. In block 416, electronic device 102 presents the value for the user interactions, such as on a display. For example, electronic device 102 may display the value to the user with an indication that the score has been validated.

IV. Example Systems for Remote Validation of User Interactions for Client-Side Scripting FIG. 5 conceptually illustrates an electronic system with which some implementations of the subject technology are implemented. Electronic system 500 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units may include instructions for remote validation of user input for client-side scripting in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Figure 5:
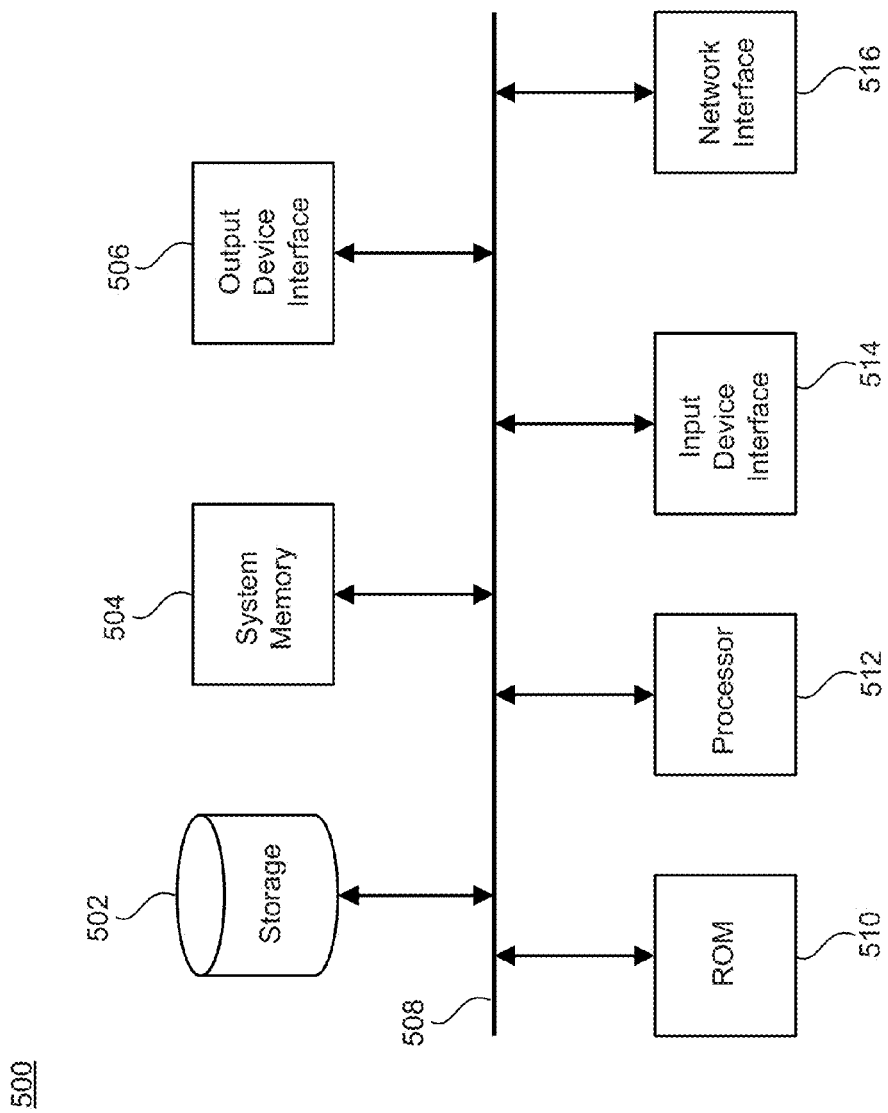
FIG. 5 conceptually illustrates an electronic system with which some implementations of the subject technology may be implemented.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Alternatively, or in addition, some implementations may be performed using one or more graphics processing units (GPUs).

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for remote validation of user interactions for client-side scripting, the method comprising:

receiving, using one or more computing devices and over a network, a transcript of a plurality of user interactions recorded during an execution of a client-side script, wherein the transcript comprises an indication of a relative time when each of the plurality of user interactions was recorded during the execution of the client-side script, wherein the client-side script comprises a plurality of graphical functions related to presenting objects on a display;

replacing, using the one or more computing devices, each of the plurality of graphical functions of the client-side script with a null function;

executing, using the one or more computing devices, the client-side script in which each graphical function is replaced with the null function, wherein each of the plurality of user interactions is provided to the executing client-side script at the relative time indicated by the transcript;

determining, using the one or more computing devices and during the executing the client-side script, whether any user interaction of the plurality of user interactions provided to the executing client-side script comprises an invalid interaction for the executing client-side script at the time when the user interaction is provided to the executing client-side script; and providing, using the one or more computing devices, an indication of whether the plurality of user interactions are valid for the client-side script based at least in part on the determining.

2. The method of claim 1, further comprising:

calculating, using the one or more computing devices, a first value corresponding to the plurality of user interactions based at least in part on values associated with at least some of the plurality of user interactions and the relative times when the at least some of the plurality of user interactions are provided to the client-side script during the executing.

3. The method of claim 2, further comprising:

providing, using the one or more computing devices and over the network, the first value.

4. The method of claim 2, wherein the execution of the client-side script renders a web-based game and the first value comprises a score in the web-based game calculated for the plurality of user interactions.

5. The method of claim 2, wherein the receiving, using the one or more computing devices and over the network, the transcript of the plurality of user interactions recorded during the execution of the client-side script further comprises:

receiving, using the one or more computing devices and over the network, the transcript of the plurality of user interactions recorded during the execution of the client-side script and a second value corresponding to the plurality of user interactions.

6. The method of claim 5, wherein the providing, using the one or more computing devices, the indication of whether the plurality of user interactions are valid for the client-side script based at least in part on the determining further comprises:

comparing, using the one or more computing devices, the first value and the second values;

providing, using the one or more computing devices, the indication that the plurality of user interactions are valid for the client-side script when the first value is equivalent to the second value and none of the plurality of user interactions is determined to comprise the invalid interaction at the time when the user interaction is provided to the executing client-side script; and providing, using the one or more computing devices, an indication that the plurality of users interactions are invalid for the client-side script when the first value is not equivalent to the second value or when any of the plurality of user interactions is determined to comprise the invalid interaction at the time when the user interaction is provided to the executing client-side script.

7. The method of claim 1, wherein the executing is performed using a plurality of the one or more computing devices that are operating in parallel.

8. The method of claim 1, wherein the executing, using the one or more computing devices, the client-side script, wherein each of the plurality of user interactions is provided to the executing client-side script at the relative time indicated by the transcript further comprises:

executing, using the one or more computing devices, a null function for any function calls in the executing client-side script that are related to presenting objects on a display.

9. The method of claim 1, wherein a user interaction of the plurality of user interactions comprises a valid interaction for the executing client-side script when the user interaction is provided to the executing client-side script at a first time during the executing of the client-side script and the user interaction of the plurality of interactions comprises the invalid interaction for the executing client-side script when the user interaction is provided to the executing client-side script at a second time during the executing the client-side script.

10. A computer-implemented method for remote validation of user interactions for client-side scripting, the method comprising:
 executing, using one or more computing devices, a client-side script received over a network;
 intercepting, using the one or more computing devices, a plurality of user interactions provided during the executing of the client-side script;
 generating, using the one or more computing devices, a transcript of the plurality of user interactions, wherein the transcript comprises a description of each of the plurality of user interactions and an indication of when each of the plurality of interactions was provided relative to the executing of the client-side script;
 sending, using the one or more computing devices and over the network, the transcript of the plurality of user interactions to one or more other computing devices;
 receiving, using the one or more computing devices and over the network, a value corresponding to the plurality of user interactions or an indication that the plurality of user interactions are invalid from the one or more other computing devices; and
 presenting, using the one or more computing devices, the value corresponding to the plurality of user interactions or the indication that the plurality of user interactions are invalid,
 wherein the client-side script comprises a plurality of graphical functions related to presenting objects on a display, and
 wherein each of the plurality of graphical functions of the client-side script are replaced with a null function for each of the one or more other computing devices.

11. The method of claim 10, wherein the executing, using the one or more computing devices, the client-side script renders a web-based game and the value corresponding to the plurality of user interactions comprises a score for the web-based game for the plurality of user interactions.

12. The method of claim 11, wherein the executing, using the one or more computing devices, the client-side script received over the network further comprises executing, using the one or more computing devices and in a browser, the client-side script received over the network.

13. The method of claim 12, wherein the intercepting, using the one or more computing devices, the plurality of user interactions provided during the executing of the client-side script further comprises, intercepting, using the one or more computing devices, the plurality of user interactions provided during the executing of the client-side script using a library that handles browser events.

14. A system, comprising:
 one or more processors; and
 a memory including instructions that, when executed by the one or more processors, cause the one or more processors to:
 receive, over a network, a transcript of a plurality of user interactions recorded during an execution of a client-side game script and a first score for the plurality of user interactions, wherein the transcript comprises an indication of a relative time when each of the plurality of user interactions was recorded relative to the execution of the client-side game script, wherein the client-side game script comprises a plurality of graphical functions related to presenting objects on a display;
 replace each of the plurality of graphical functions of the client-side game script with a null function;
 execute the client-side game script in which each graphical function is replaced with the null function, wherein each of the plurality of user interactions is recreated at the relative time during executing the client-side game scrip that is indicated by the transcript;
 calculate, during executing the client-side game script, a second score for the plurality of user interactions, wherein the second score is determined based at least in part on values associated with at least some of the plurality of user interactions and the relative times when the at least some of the plurality of user interactions are recreated during executing the client-side game script; and
 provide the second score when the second score is equivalent to the first score, otherwise provide an indication that the plurality of user interactions are invalid or that the first score is invalid.

15. A non-transitory machine readable medium embodying instructions that, when executed by a machine, allow the machine to perform a method for remote validation of user interactions for scripting, the method comprising:
 receiving, over a network, a transcript of a plurality of user interactions recorded during an execution of a script, wherein the transcript comprises an indication of a time when each of the plurality of user interactions was recorded relative to the execution of the script, wherein the script comprises a plurality of graphical functions related to presenting objects on a display;
 replacing each of the plurality of graphical functions of the script with a null function;
 executing the script in which each graphical function is replaced with the null function within a script engine, wherein each of the plurality of user interactions is provided to the script during the executing at the time indicated by the transcript;
 determining, during the executing, whether any user interaction of the plurality of user interactions provided to the executing script comprises an invalid interaction for the executing script at the time when the user interaction is provided to the executing script; and
 providing an indication of whether the plurality of user interactions are valid for the script based at least in part on the determining.

16. The machine-readable medium of claim 15, wherein the script comprises a client-side script.

17. The machine-readable medium of claim 15, wherein the method further comprises:
 calculating a first value corresponding to the plurality of user interactions based at least in part on values associated with at least some of the plurality of user interactions and the times when the at least some of the plurality of user interactions are provided to the script during the executing.

18. The machine-readable medium of claim 17, wherein the execution of the client-side script renders a web-based game and the first value comprises a score in the web-based game for the plurality of user interactions.

\* \* \* \* \*